US012280995B2

(12) United States Patent
Marinelli et al.

(10) Patent No.: US 12,280,995 B2

(45) Date of Patent: Apr. 22, 2025

(54) VEHICLE LIFT AND PROCESS FOR LIFTING VEHICLES

(71) Applicant: Ravaglioli S.p.A., Sasso Marconi (IT)

(72) Inventors: Mauro Marinelli, Bologna (IT); Sandro Ramponi, Porotto (IT); Gianluca Longhi, Zola Predosa (IT); Simone Bui, Zola Predosa (IT)

(73) Assignee: Vehicle Service Group Italy S.r.l., Ostellato (IT)

( * ) Notice: Subject to any disclaimer, the term of this patent is extended or adjusted under 35 U.S.C. 154(b) by 295 days.

(21) Appl. No.: 17/983,704

(22) Filed: Nov. 9, 2022

(65) Prior Publication Data

US 2023/0146276 A1 May 11, 2023

(30) Foreign Application Priority Data

Nov. 9, 2021 (IT) ........................ 102021000028487

(51) Int. Cl.

| | |
|---|---|
| ***B66F 7/00*** | (2006.01) |
| ***B66F 7/06*** | (2006.01) |
| ***B66F 7/08*** | (2006.01) |
| ***B66F 7/28*** | (2006.01) |

(52) U.S. Cl.

CPC ................ *B66F 7/28* (2013.01); *B66F 7/065* (2013.01); *B66F 7/08* (2013.01)

(58) Field of Classification Search

CPC ........ B66F 7/26; B66F 7/0683; B66F 7/0666; B66F 7/0675; B66F 7/065

See application file for complete search history.

(56) References Cited

U.S. PATENT DOCUMENTS

| | | | | |
|---|---|---|---|---|
| 4,679,660 A | | 7/1987 | Suzuki | |
| 4,715,477 A | | 12/1987 | Suzuki | |
| 5,322,143 A | | 6/1994 | Curran | |
| 8,191,865 B2 | * | 6/2012 | Polins | B66B 9/16 254/122 |
| 2019/0144249 A1 | * | 5/2019 | Bartos | B66F 7/065 187/211 |
| 2019/0256333 A1 | * | 8/2019 | Stapensea | B66F 7/20 |

(Continued)

FOREIGN PATENT DOCUMENTS

| | | |
|---|---|---|
| EP | 1468755 A1 | 10/2004 |
| JP | H09-221298 A | 8/1997 |

(Continued)

OTHER PUBLICATIONS

Italian Search Report and Written Opinion dated Jun. 17, 2022, for Application No. 202100028487, 8 pages.

*Primary Examiner* — Lee D Wilson

(74) *Attorney, Agent, or Firm* — Frost Brown Todd LLP

(57) ABSTRACT

A vehicle lift comprising a movement system configured to be installed in a pit in the ground, a platform engaged with the movement system and movable entering to and exiting from the pit, at least one arm carried by the platform and configured for contacting a vehicle to be lifted. The arm is movable between an extended position and a retracted position. The lift comprises a stop movable relative to the platform between a grip position where it engages the arm and a release position where it disengages the arm. The lift comprises an actuator carried by the platform and active on the stop to move said stop between the grip position and the release position.

21 Claims, 6 Drawing Sheets

(56) References Cited

U.S. PATENT DOCUMENTS

| | | | | |
|---|---|---|---|---|
| 2020/0115205 | A1* | 4/2020 | Finkbeiner ................ | B66F 7/28 |
| 2021/0114852 | A1* | 4/2021 | Heath ....................... | B66F 7/28 |

FOREIGN PATENT DOCUMENTS

| | | | |
|---|---|---|---|
| JP | 2002-128479 | A | 5/2002 |
| JP | 2012-020815 | A | 2/2012 |
| WO | WO 2006/112857 | A2 | 10/2006 |

* cited by examiner

FIG.1
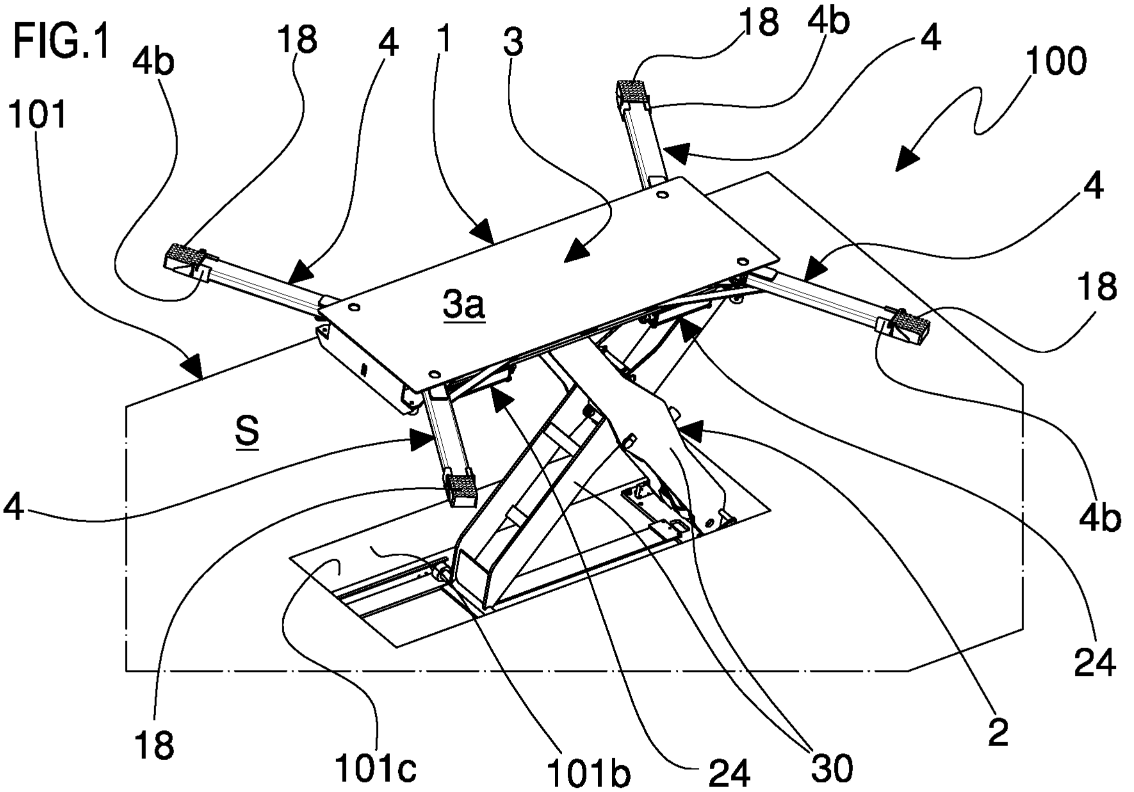
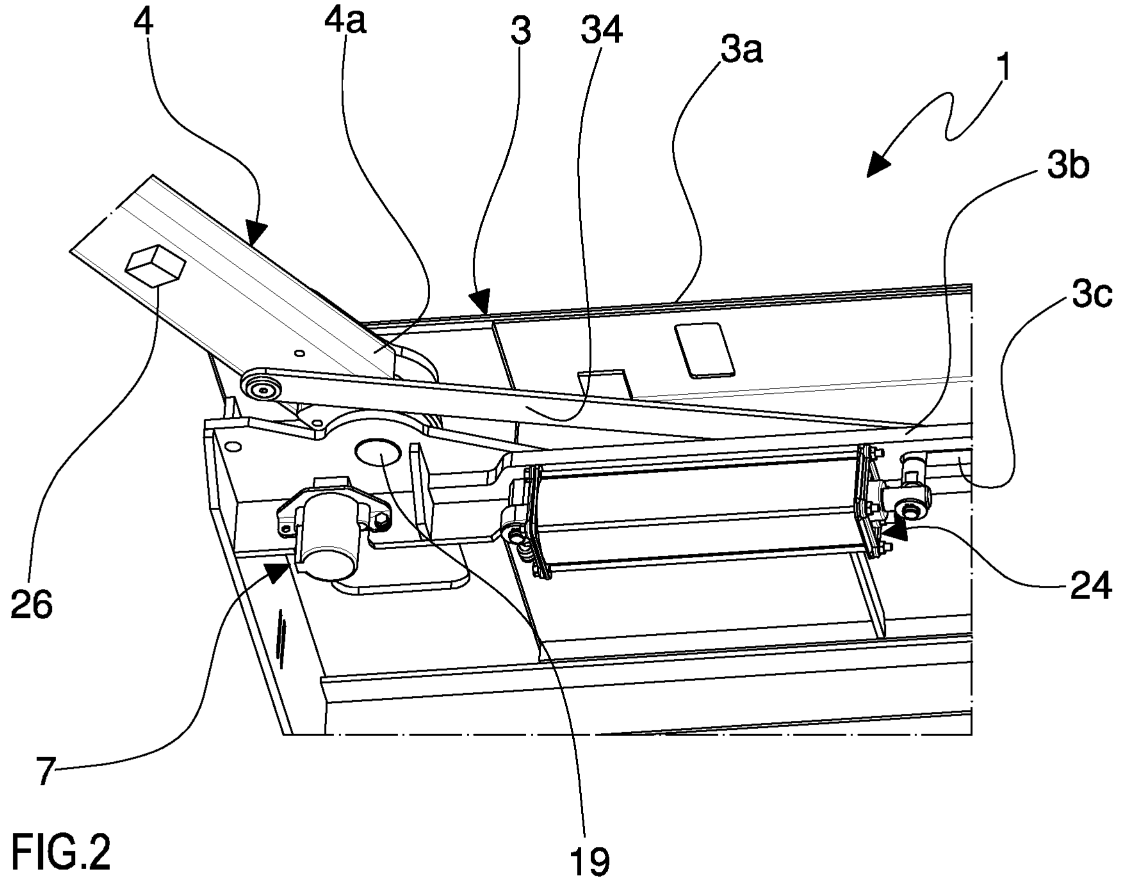
FIG.2

FIG.3
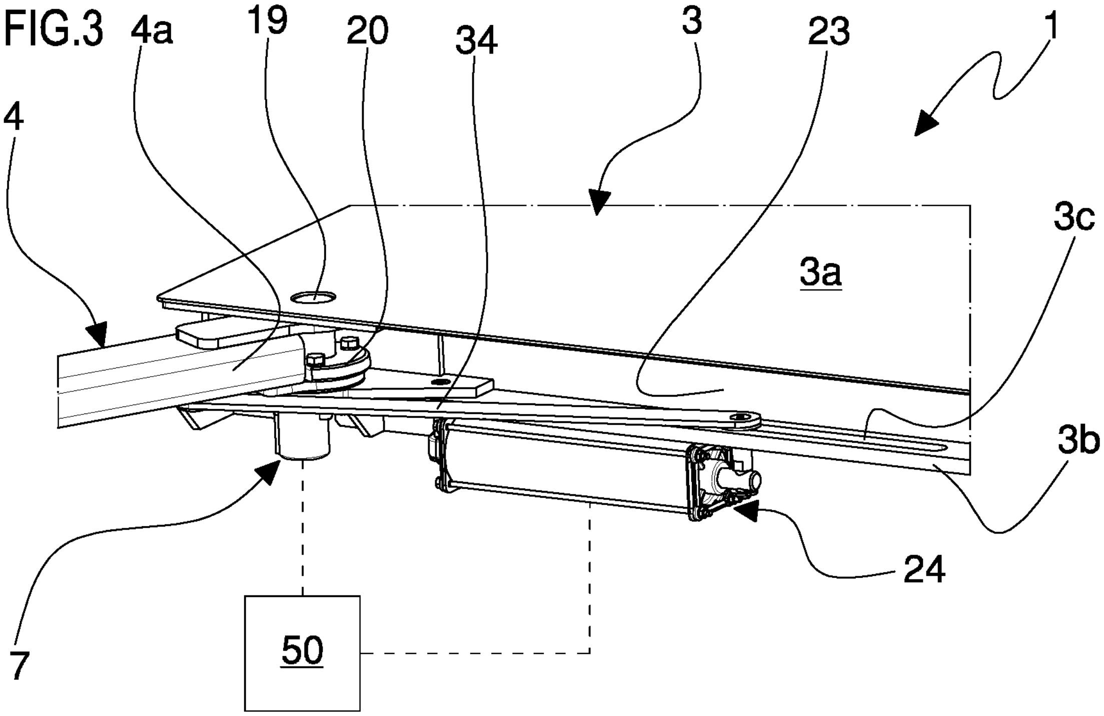
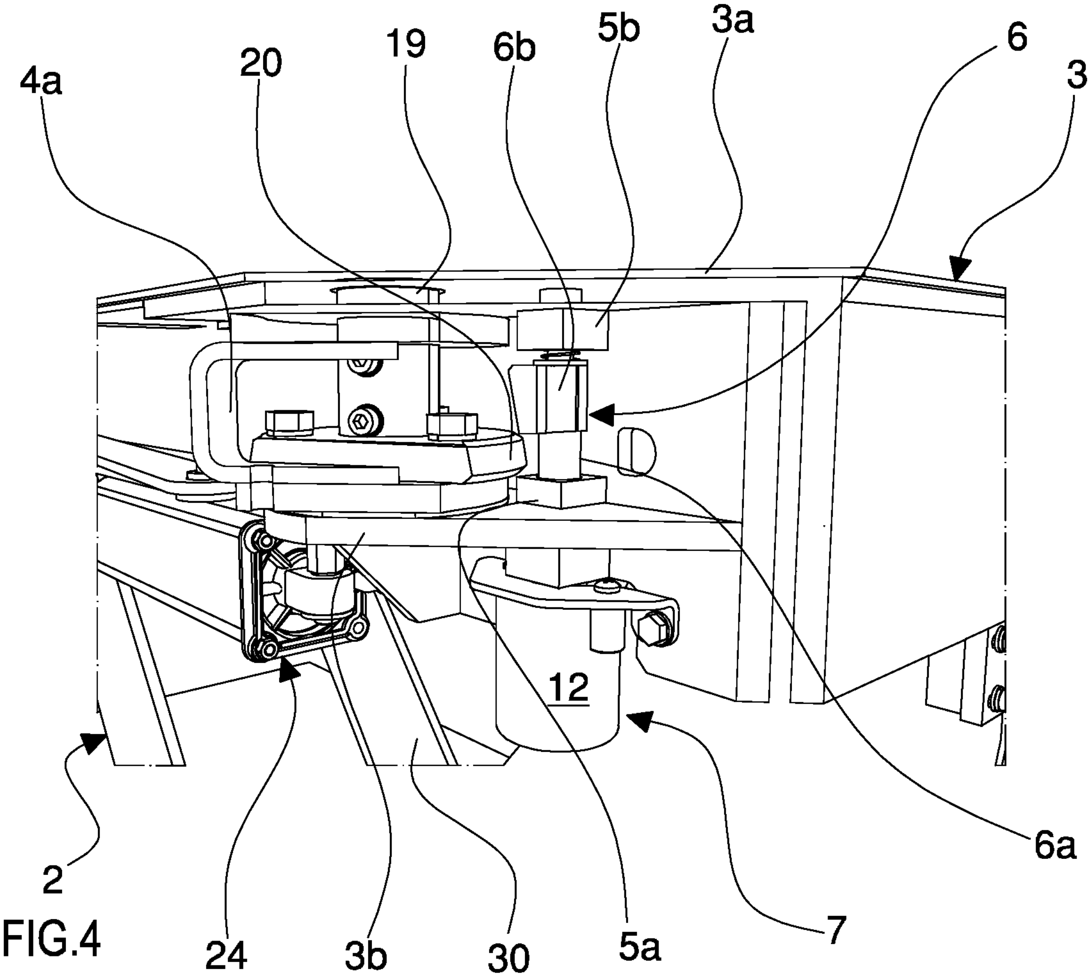
FIG.4

FIG.5
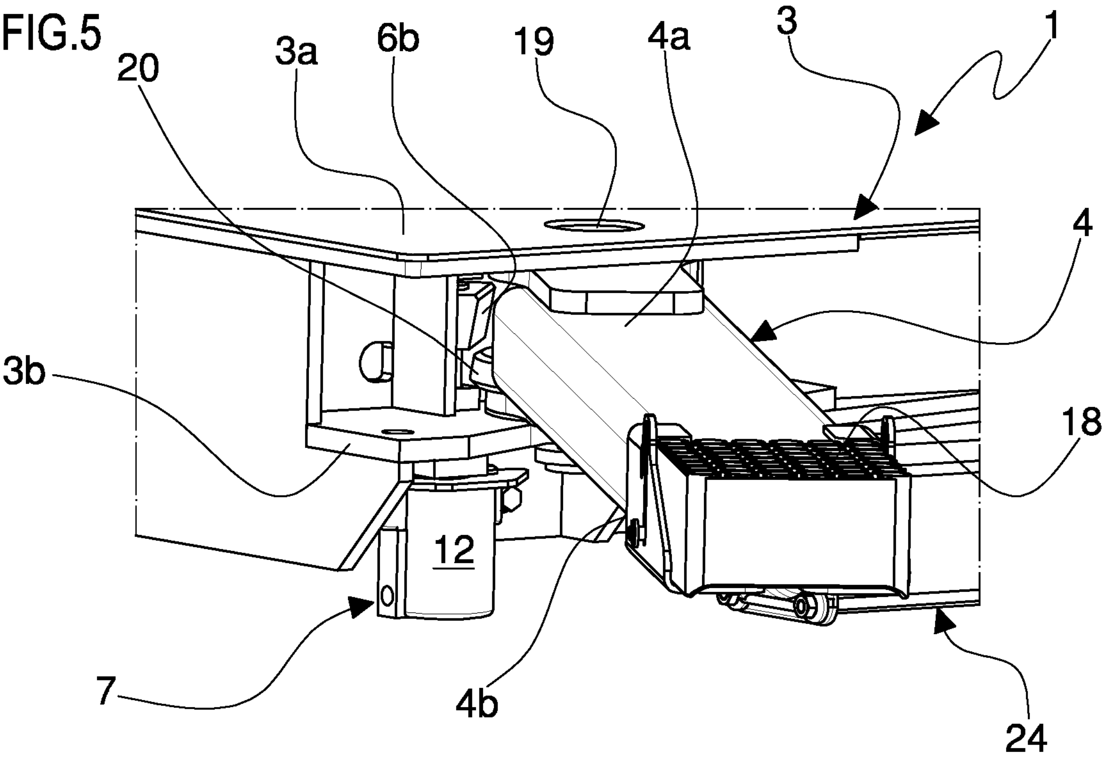
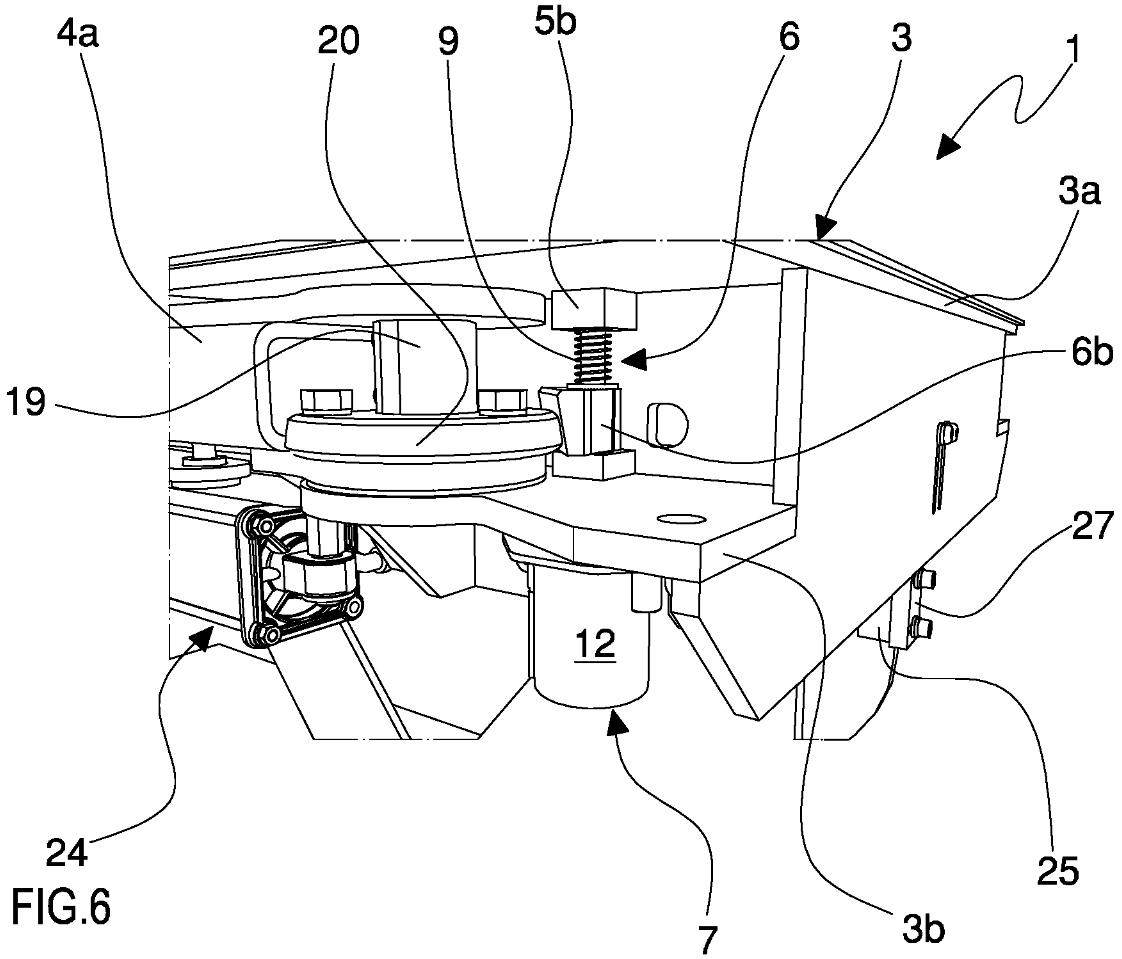
FIG.6

FIG.7
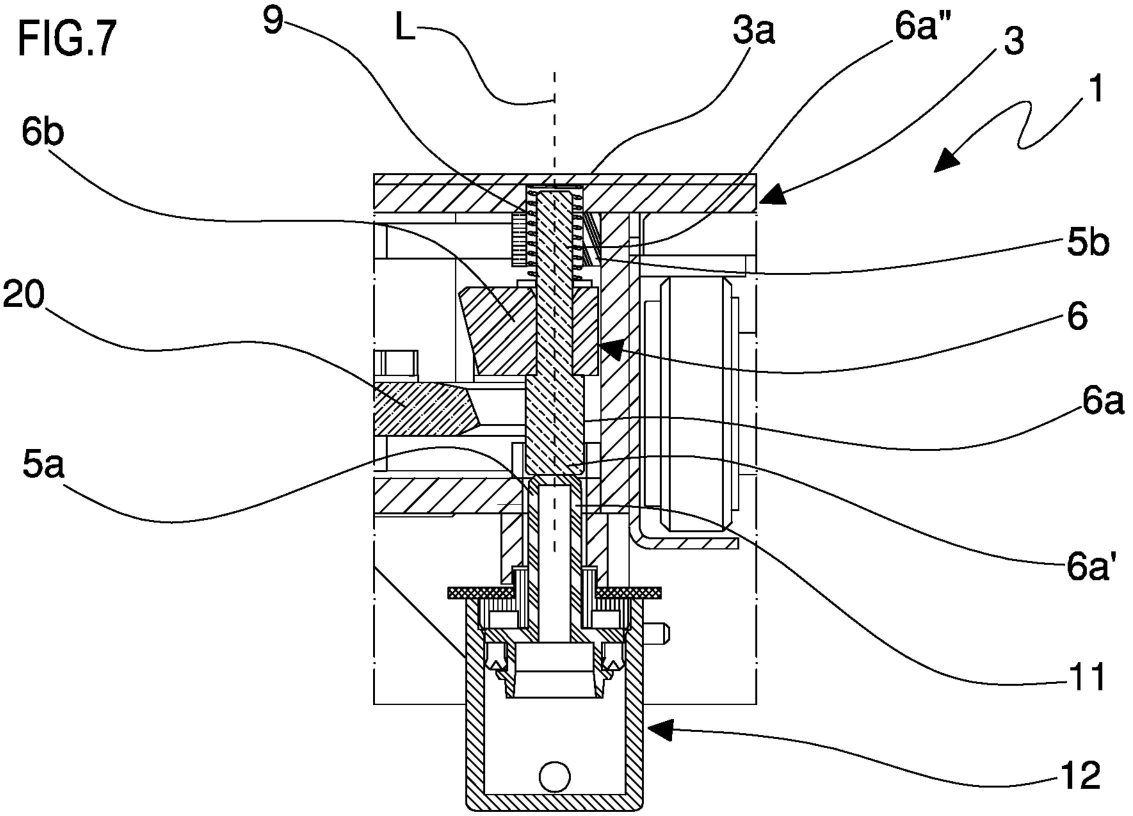
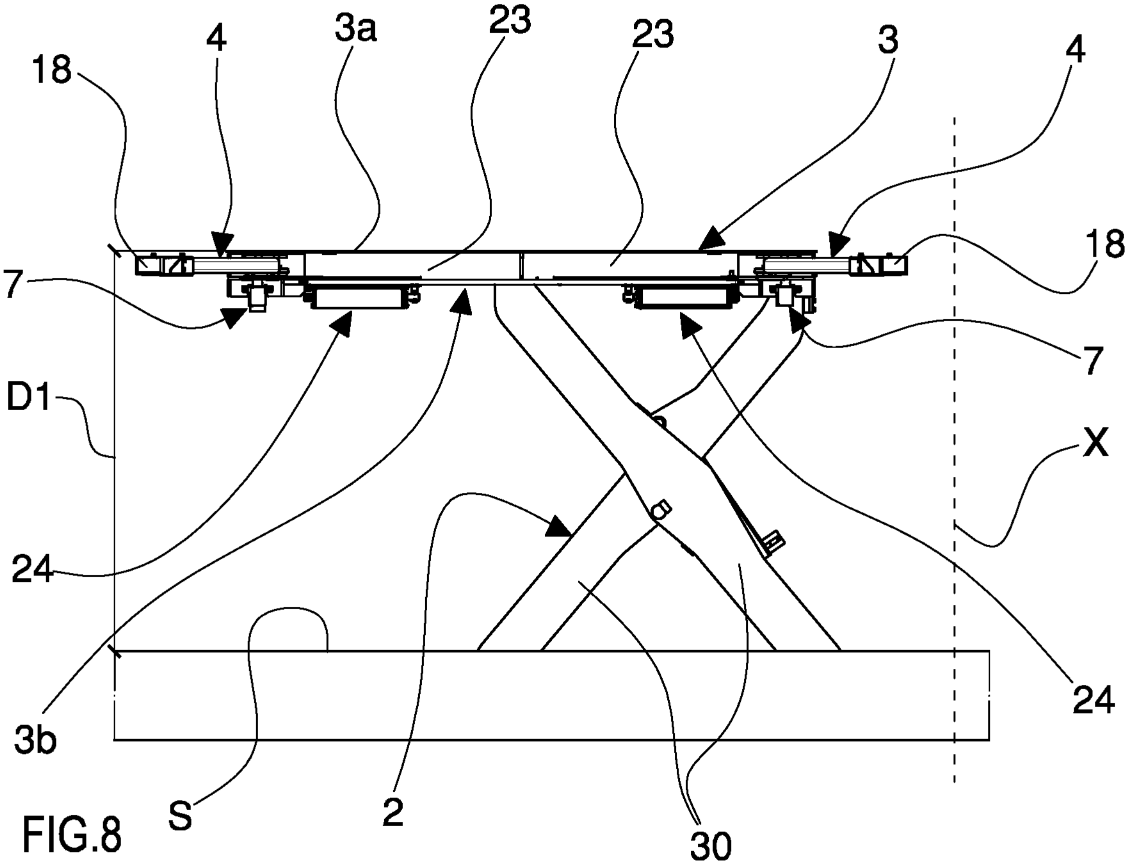
FIG.8

FIG.9
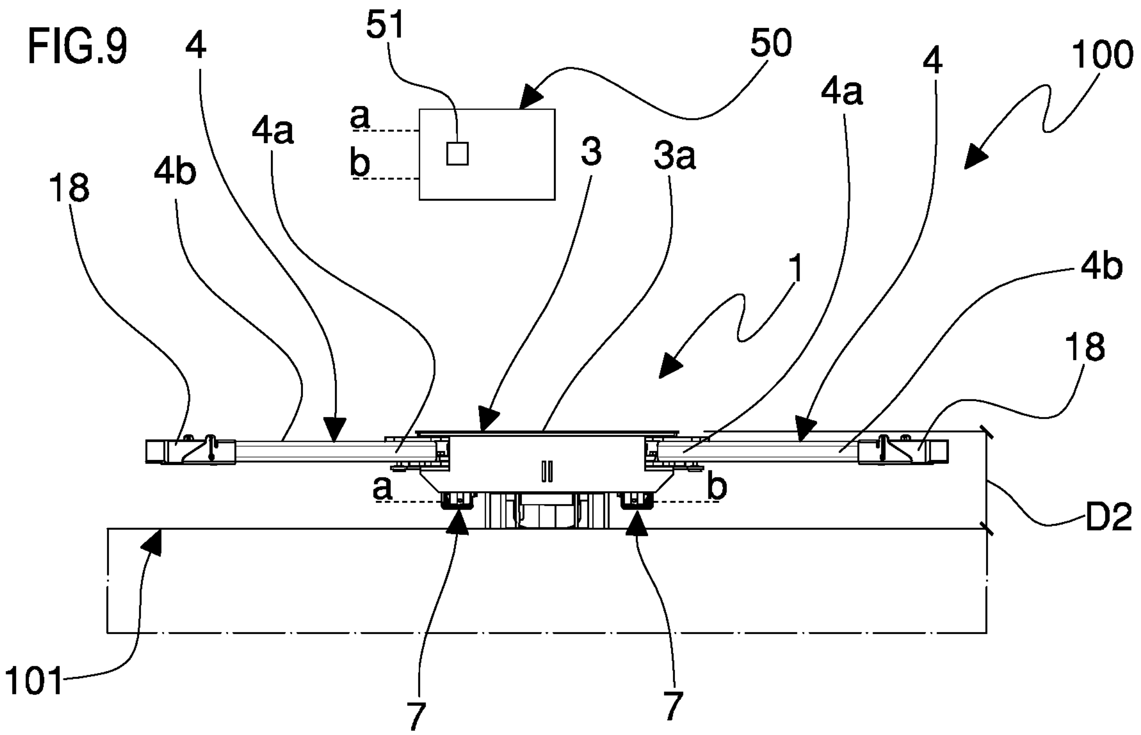
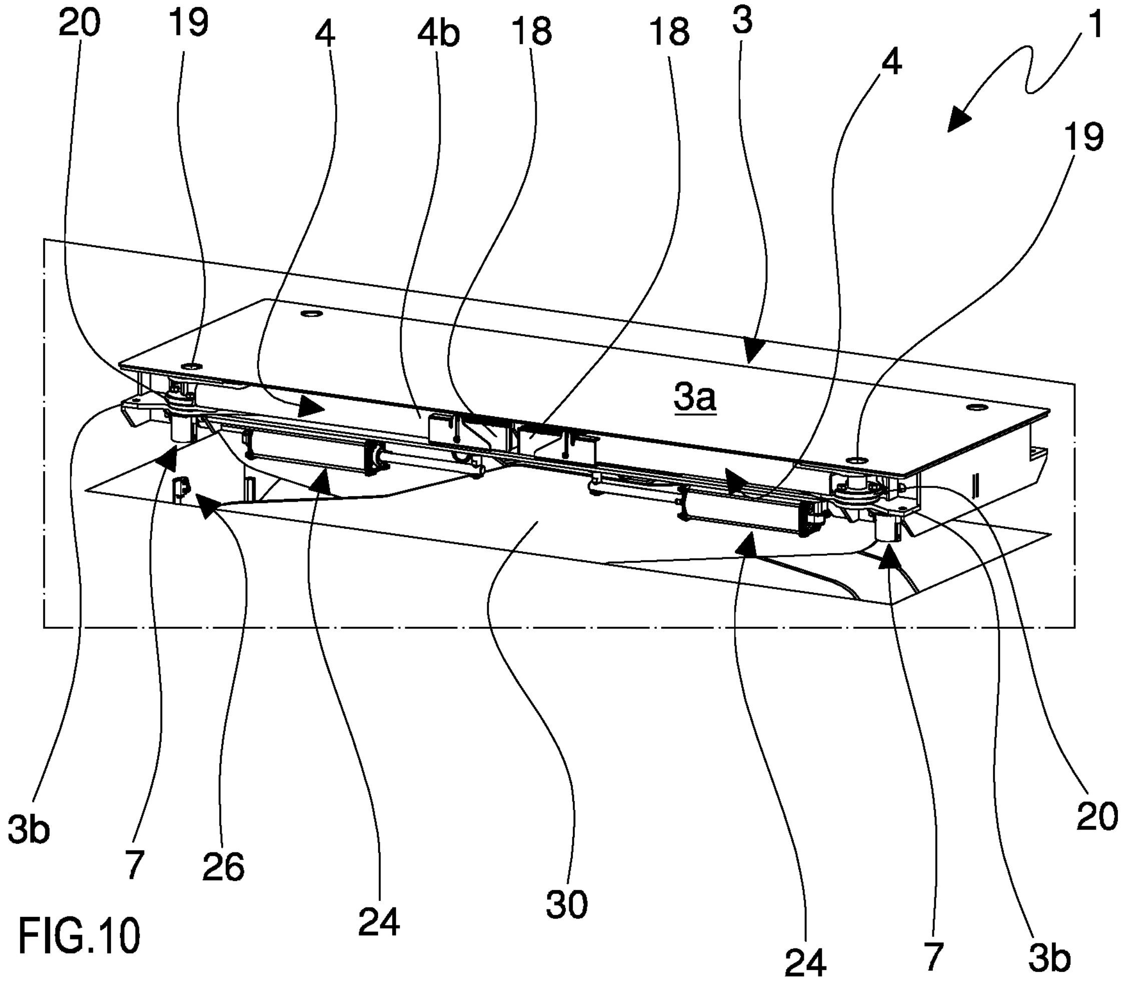
FIG.10

FIG.11
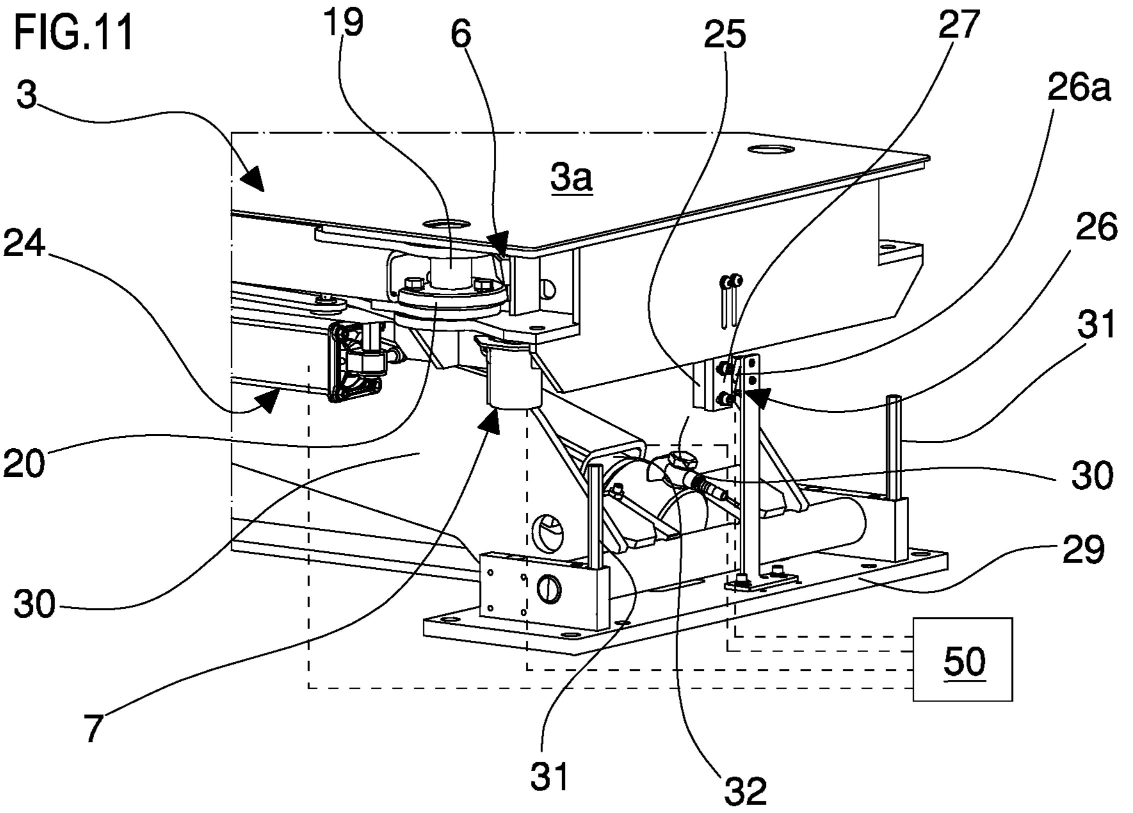
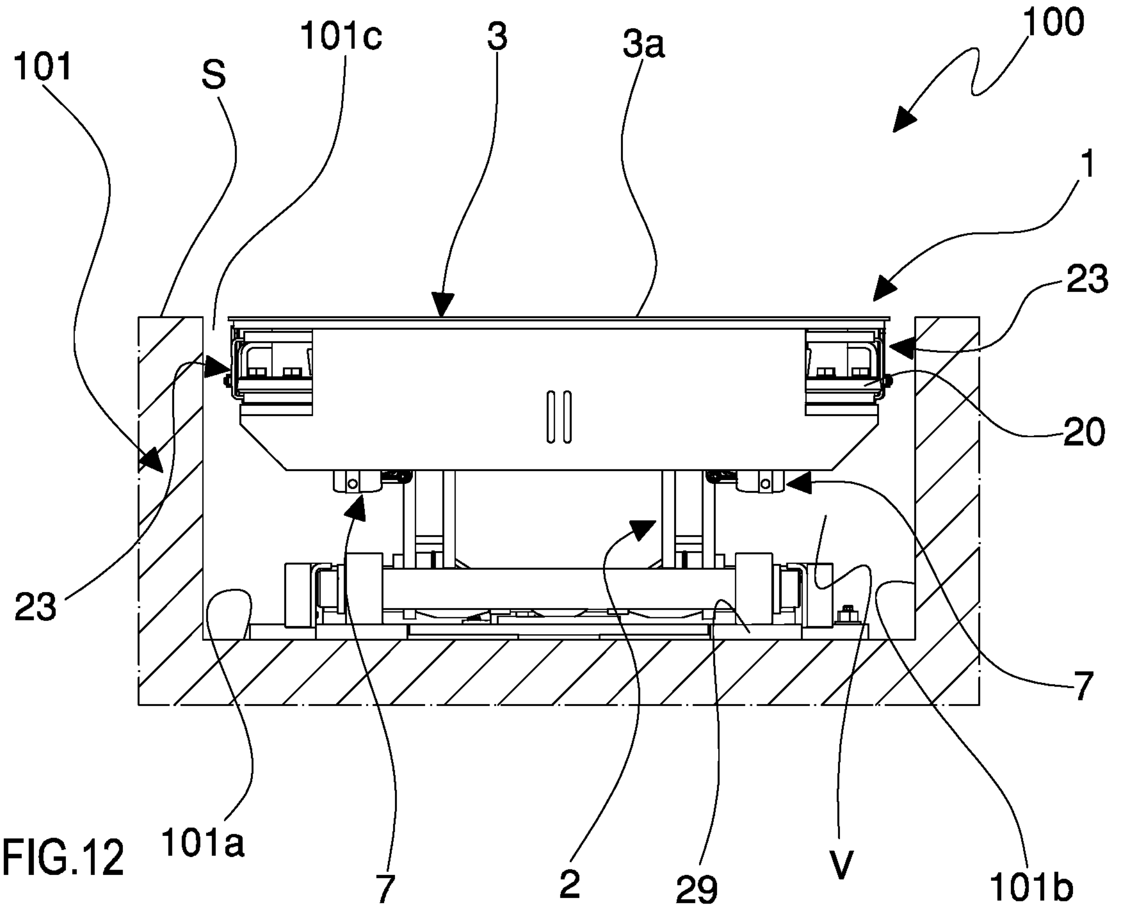
FIG.12

VEHICLE LIFT AND PROCESS FOR LIFTING VEHICLES

FIELD OF INVENTION

The present invention relates to vehicle lifts, e.g., in-ground lifts or pit lifts, and a process of lifting vehicles. The present invention may be used in the automotive field for servicing vehicles, e.g., cars, trucks, farm vehicles.

STATE OF THE ART

Different types of lifts are employed for lifting vehicles so as to allow servicing. U.S. Pat. Nos. 4,715,477 and 4,679,660 show column lifts comprising vertical columns, each of which carries a carriage provided with a pair of orientable and extensible arms configured for receiving the vehicle to be lifted. Each arm has a cylinder configured for blocking rotation of the respective arm when the carriage is spaced from the ground. When the carriage is instead placed at the ground, the carriage itself allows to vertically move a shaft suitable for unlocking the rotation of the arm such that said arm can be moved below the vehicle. However, the Applicant observed that such column lifts are bulky due to the presence of the columns and of the arms emerging from the columns.

Patent application nos. EP1468755A1 and WO2006112857A2 and U.S. Pat. No. 5,322,143 show conventional scissors lifts, usually installed in pits such that, in a lowered position, these lifts are entirely housed in the ground. Thanks to their structure, in-ground lifts are less bulky than column lifts and they are suitable for narrow settings.

An in-ground scissor lift is described in patent application no. JP2002128479A. Such lifts comprise a movable platform carrying an extractable plate vertically movable with respect to the platform between a lowered position and an extracted position. The lift also comprises four retractable arms hinged to the extractable plate: the arms are rotatably movable in the extracted position of the plate to allow said arms to be positioned under the vehicle. In the extracted position, said arms are still movable relative to the plate. The Applicant observed that known in-ground lifts are unable to safely support the lifted vehicle and not flexible in use.

Therefore, the Applicant observed that known lifts are not free of limitations, and thus susceptible of improvements.

SUMMARY

One aspect concerns a vehicle lift comprising:

- a movement system configured to be installed in a pit in the ground,
- a platform engaged with the movement system,
- an arm carried by the platform and configured for lifting a vehicle, said arm being movable relative to the platform at least between an extended position and a retracted position,
- at least one stop movable relative to the platform at least between:
  - a grip position where the stop engages the arm to block the relative movement of said arm with respect to the platform,
  - a release position where the stop disengages the arm to allow the movement of said arm between the extended position and the retracted position.

In one aspect according to the preceding aspect, the lift comprises at least one actuator active on the stop. In one aspect according to the preceding aspect, the actuator is carried by the platform. In one aspect according to any one of the two preceding aspects, the actuator is configured for moving the stop between the grip position and the release position. In one aspect according to any one of the preceding aspects, the stop is carried by the platform. In one aspect according to any one of the preceding aspects, the platform is movable entering to and exiting from the pit. In one aspect according to any one of the preceding aspects, the platform is moved by the movement system. In one aspect according to any one of the preceding aspects, the movement system is configured for moving the platform entering to and exiting from the pit. In one aspect according to any one of the preceding aspects, the arm is configured for lifting the vehicle during the movement of the platform exiting from the pit. In one aspect according to any one of the preceding aspects, the arm is rotatable movable with respect to the platform between the extended position and the retracted position. In one aspect according to any one of the preceding aspects, the arm is hinged to the platform.

In one aspect according to any one of the preceding aspects, the stop, in the grip position, blocks the relative rotation between the arm and the platform. In one aspect according to any one of the preceding aspects, the stop, in the release position, disengages the arm to allow a relative rotation between said arm and the platform. In one aspect according to any one of the preceding aspects, the arm, in the extended position, laterally emerges from the platform. In one aspect according to any one of the preceding aspects, the arm, in the retracted position, is side-by-side with the platform.

In one aspect according to any one of the preceding aspects, the platform is movable at least between:

- a lifted position where the platform is configured for being placed completely outside the pit and
- a lowered position where the platform is configured for being placed completely outside the pit, at a distance from the ground shorter than a distance between the ground and the platform when said platform is in the lifted position.

In one aspect according to the preceding aspect, the lift, in the lifted position of the platform, is configured for lifting a vehicle with respect to the ground. In one aspect according to the two preceding aspects, the lift, in the lowered position of the platform, is configured for not contacting a vehicle placed above the pit.

In one aspect according to any one of the preceding aspects, the platform is movable between the lifted position and the lowered position along a lifting direction. In one aspect according to the preceding aspect, the lifting direction of the platform, in use, is vertical.

In one aspect according to any one of the preceding aspects, the platform comprises an upper plate and an opposite lower plate. In one aspect according to the preceding aspect, the upper plate of the platform defines a top abutment plane of the platform which, in use, is configured for facing a vehicle to be lifted. In one aspect according to any one of the two preceding aspects, the lower plate, in the lifted position of the platform, is configured for being directed towards the pit. In one aspect according to any one of the three preceding aspects, the stop is at least partly interposed between said upper plate and said lower plate.

In one aspect according to any one of the preceding aspects, the platform has a substantially rectangular parallelepiped shape. In one aspect according to any one of the preceding aspects, the arm is placed at a corner portion of the platform.

In one aspect according to any one of the preceding aspects, the platform extends along an ideal extension plane.

In one aspect according to any one of the preceding aspects, the platform comprises:

a through opening defined on the lower plate, said through opening receiving in passage at least part of the stop and at least one portion of the actuator, and a blind sleeve carried by the upper plate and suitable for guiding slide of the stop.

In one aspect according to any one of the preceding aspects, the platform is further movable between the lowered position and a recessed position. In one aspect according to the preceding aspect, the platform, in the recessed position, is placed at least partly in the pit, optionally substantially aligned with the ground.

In one aspect according to any one of the preceding aspects, the platform has at least one lateral pocket configured for housing at least one arm placed in the retracted position. In one aspect according to any one of the preceding aspects, the platform has, at opposite lateral flanks, two respective lateral pockets, each of which is suitable for housing a pair of arms placed in the retracted position.

In one aspect according to any one of the preceding aspects, the movement system comprises:

a base configured for being fixed to a bottom of the pit, and a frame engaged, on one side, with the base and engaged, on an opposite side, with the platform, wherein the frame is configured for moving the platform between the lowered position and the lifted position, and vice versa.

In one aspect according to the preceding aspect, the frame comprises an articulated parallelogram or a scissors system, optionally to define a lift of scissors type. In one aspect according to any one of the two preceding aspects, the frame is moved by a cylinder, optionally of hydraulic type.

In one aspect according to any one of the preceding aspects the arm, in the lowered position of the platform, is rotatable between the retracted position and the extended position. In one aspect according to any one of the preceding aspects, the arm is rotatably movable with respect to the platform only in the lowered position of the platform.

In one aspect according to any one of the preceding aspects, the arm, optionally each arm of the lift, extends from an attachment portion, engaged (optionally hinged) to the platform, to an opposite end portion, wherein the end portion of each arm is configured for supporting a vehicle.

In one aspect according to the preceding aspect, the arm, at the end portion, comprises at least one support configured for contacting the vehicle. In one aspect according to the preceding aspect, the support, in the extended position of the arm, is placed at a minimum distance from the platform greater than 300 mm, optionally between 350 mm and 750 mm. In one aspect according to any one of the three preceding aspects, the end portion of the arm, in the retracted position, is alongside a flank of the platform.

In one aspect according to any one of the preceding aspects, the lift comprises a plurality of arms. In one aspect according to any one of the preceding aspects, the lift comprises a stop for each arm. In one aspect according to any one of the preceding aspects, the lift comprises at least one arm at each corner portion of the platform.

In one aspect according to any one of the preceding aspects, the lift comprises:

a first pair of arms engaged at a first flank of the platform, and a second pair of arms engaged at a second flank of the platform, opposite said first flank.

In one aspect according to the preceding aspect, the arms of each pair, during the movement between the retracted position and the extended position, space the respective end portions from each other and with respect to the flank of the platform. In one aspect according to any one of the two preceding aspects, the arms of each pair, in the retracted position, have the respective end portions alongside the platform and face each other.

In one aspect according to any one of the three preceding aspects, the arms of said plurality lie on a same ideal plane. In one aspect according to any one of the four preceding aspects, the arms of said plurality lie on an ideal plane parallel to a lying plane of the platform.

In one aspect according to any one of the preceding aspects, each arm extends from the attachment portion to the end portion along an extension direction, wherein each arm has a length, measured along said extension direction, greater than 200 mm, still more optionally comprised between 300 mm and 700 mm.

In one aspect according to any one of the preceding aspects, each arm is hinged to the platform and is movable around an axis substantially orthogonal to an extension plane of the same platform. In one aspect according to any one of the preceding aspects, each arm is hinged to the platform at the respective attachment portion.

In one aspect according to any one of the preceding aspects, the arm has a blocking body configured for engaging the stop in the grip position. In one aspect according to the preceding aspect, the blocking body is defined at the attachment portion of the arm. In one aspect according to any one of the two preceding aspects, the blocking body comprises a toothed profile. In one aspect according to any one of the two preceding aspects, the blocking body of the arm comprises a plurality of teeth aligned along a curvilinear trajectory, still more optionally circular. In one aspect according to any one of the three preceding aspects, the stop, in the grip position, directly engages the blocking body of the arm to block the relative rotation of said arm with respect to the platform. In one aspect according to any one of the four preceding aspects, the blocking body of the arm is interposed between the upper plate and the lower plate of the platform.

In one aspect according to any one of the preceding aspects, the lift comprises at least one auxiliary actuator configured for moving the arm between the retracted position and the extended position, in the release position of the stop. In one aspect according to the preceding aspect, the auxiliary actuator, on one side, engages the platform and, on an opposite side, it engages the arm. In one aspect according to any one of the two preceding aspects, the auxiliary actuator, optionally slidingly, engages the lower plate of the platform.

In one aspect according to any one of the preceding aspects, the actuator, in the lowered position of the platform, is configured for pushing on the stop to move it from the grip position to the release position. In one aspect according to any one of the preceding aspects the actuator is engaged below the lower plate. In one aspect according to any one of the preceding aspects the actuator, in the lifted position and in the lowered position of the platform, is configured for being placed completely outside the pit, optionally spaced from the ground. In one aspect according to any one of the preceding aspects, the stop, in the lifted position and in the lowered position of the platform, is configured for being placed completely outside the pit, optionally spaced from the ground.

In one aspect according to any one of the preceding aspects, the actuator is configured for generating, in the lowered position of the platform, a thrust force acting on the stop having direction exiting from the pit. In one aspect according to any one of the preceding aspects, the actuator is configured for generating, in the lowered position of the platform, a thrust force acting on the stop directed on the side opposite the ground. In one aspect according to any one of the preceding aspects, the actuator is configured for generating, in the lowered position of the platform, a thrust force acting on the stop directed along a direction parallel to the lifting direction.

In one aspect according to any one of the preceding aspects, the actuator comprises a hydraulic cylinder or a pneumatic cylinder comprising: a jacket, a stem movable entering to and exiting from the jacket. In one aspect according to any one of the preceding aspects, the stem is movable at least between:

an upper end stop position where a main part of the stem exits from the jacket, and a lower end stop position where a main part of the stem is placed inside the jacket.

In one aspect according to any one of the two preceding aspects, the stem, at least in the upper end stop position, crosses the through opening defined on the lower plate of the platform to push on the stop, optionally to maintain said stop in the release position.

In one aspect according to any one of three preceding aspects, the stem, in the lowered position of the platform, is movable between the lower end stop position and the upper end stop position to move the stop, from the grip position to the release position. In one aspect according to any one of four preceding aspects, the stem is movable between the lower end stop position and the upper end stop position when the arm is in the retracted position or in the extended position. In one aspect according to any one of five preceding aspects, the stem, during the movement of the arm between the retracted position and the extended position, is in the upper end stop position so as to maintain the stop in the release position.

In one aspect according to any one of six preceding aspects, the stem is movable along a direction parallel to the lifting direction. In one aspect according to any one of seven preceding aspects, the stem is movable along a vertical direction while in use.

In one aspect according to any one of eight preceding aspects, the stem is movable from the lower end stop position to the upper end stop position by introduction of a work fluid in the jacket, wherein said stem is movable from the lower end stop position to the upper end stop position when the pressure of the fluid present in the jacket is equal to or greater than 1 bar, optionally between 1 bar and 10 bar.

In one aspect according to any one of the preceding aspects, the stop, in the lifted position of the platform, is configured for maintaining the grip position. In one aspect according to any one of the preceding aspects, the actuator, in the lifted position of the platform, is configured for maintaining the stop in the grip position. In one aspect according to any one of the preceding aspects, the actuator, in the lifted position of the platform, is configured for not pushing on the stop such that said stop may maintain the lower end stop position. In one aspect according to any one of the preceding aspects, the stop is placed in the grip position at least:

in the lifted position of the platform, during the movement of the platform between the lowered position and the lifted position, in the extended position of the arm, in the retracted position of the arm.

In one aspect according to any one of the preceding aspects, the stop comprises:

a rod engaged to the platform, and a blocking head fixed on the rod.

In one aspect according to the preceding aspect, the blocking head, in the grip position of the stop, engages the arm to prevent the relative rotation of said arm with respect to the platform.

In one aspect according to any one of the preceding aspects, the stop is movable between the grip position and the release position along a direction. In one aspect according to the preceding aspect, the movement direction of the stop is parallel to the lifting direction of the platform. In one aspect according to any one of the two preceding aspects, the movement direction of the stop is, in use, vertical.

In one aspect according to any one of the preceding aspects, the rod of the stop is slidingly engaged into the through opening of the platform.

In one aspect according to any one of the preceding aspects, the through opening of the platform receives in passage at least part of the rod of the stop and at least one portion of the actuator. In one aspect according to any one of the preceding aspects, the blind sleeve guides the sliding of the rod of the stop. In one aspect according to any one of the preceding aspects, the blocking head of the stop is placed outside the through opening of the platform. In one aspect according to any one of the preceding aspects, the blocking head of the stop is interposed between the upper plate and the lower plate of the platform.

In one aspect according to any one of the preceding aspects, the actuator is at least partially movable across the through opening to contact the rod of the stop. In one aspect according to any one of the preceding aspects, the blocking head comprises at least one of: a toothed profile, a toothed wheel, a pad sliding block.

In one aspect according to any one of the preceding aspects, the stem of the actuator is in contact with the rod. In one aspect according to any one of the preceding aspects, the stem of the actuator is configured for pushing directly on the rod of the stop, optionally to move said stop in the release position.

In one aspect according to any one of the preceding aspects, the blocking head, in the grip position, is engaged directly with the blocking body of the arm. In one aspect according to any one of the preceding aspects, the blocking head of the stop is disengageable from the blocking body only in the lowered position of the platform. In one aspect according to any one of the preceding aspects, the actuator is configured for pushing on the stop only in the lowered position of the platform.

In one aspect according to any one of the preceding aspects, the lift comprises at least one return element pushing on the stop to force said stop to maintain the grip position. In one aspect according to the preceding aspect, the return element is interposed between the platform and the stop. In one aspect according to any one of the preceding aspects, the return element is interposed between the upper plate and the blocking head of the stop. In one aspect according to any one of the preceding aspects, the return element pushes, optionally directly, on the blocking head of the stop. In one aspect according to any one of the preceding aspects, the return element is housed at least partly in the blind sleeve. In one aspect according to any one of the preceding aspects, the stop is interposed between the actuator and the return element. In one aspect according to any one of the preceding aspects, the return element is configured for pushing on the stop to maintain it in the grip position. In one aspect according to any one of the preceding aspects, the return element comprises an elastic return element. In one aspect according to any one of the preceding aspects, the return element comprises at least one of: a compression spring, a torsion spring, a hydraulic actuator, a pneumatic actuator, an electric motor.

In one aspect according to any one of the preceding aspects, the actuator is configured for pushing on the stop to move it from the grip position to the release position and generate a thrust force on the stop greater than a thrust force impartible by the return element.

In one aspect according to any one of the preceding aspects, the stop is movable from the release position to the grip position by a thrust action exerted by the return element.

In one aspect according to any one of the preceding aspects, the lift comprises at least one sensor configured for generating a signal representative of at least one of: a position of the platform, a minimum distance between the platform and the ground. In one aspect according to the preceding aspect, the sensor comprises at least one switch carried by the movement system and activable by an actuation body carried by the platform. In one aspect according to the preceding aspect, the actuation body is configured for contacting the switch at least in the lowered position of the platform.

In one aspect according to any one of the three preceding aspects, the signal generated by the sensor, optionally by the switch, is representative of the position of the platform placed in the lowered position.

In one aspect according to any one of the four preceding aspects, the platform comprises an adjuster configured for moving the actuation body relative to the platform, optionally along a direction parallel to the lifting direction. In one aspect according to any one of the five preceding aspects, the sensor, optionally the switch, is fixed to the base of the movement system.

In one aspect according to any one of the preceding aspects, the lift comprises a control unit active to command the actuator, wherein the control unit is configured for commanding the grip and release positions of the actuator, at least in the lowered position of the platform. In one aspect according to the preceding aspect, the control unit is connected to the movement system and to the sensor, wherein the control unit is configured to:

- command the movement system to move the platform relative to the ground,
- receive the signal from the sensor to determine the lowered position of the platform,
- following the determination of the lowered position, command the blocking of the movement system to stop the platform in said lowered position.

In one aspect according to the preceding aspect, the control unit, following the blocking of the platform in the lowered position, is configured for commanding the actuator to move the stop in the release position such that the arm is movable, optionally rotatably movable, relative to the platform.

In one aspect according to any one of the two preceding aspects, the control unit, following the command of the actuator to move the stop in the release position, is configured for:

- commanding the actuator to move the stop in the grip position to block the arm with respect to the platform,
- after the blocking of the arm with respect to the platform, newly commanding activation of the movement system to move the platform from the lowered position to the lifted position.

In one aspect according to any one of the preceding aspects, the control unit is connected to the plurality of auxiliary actuators, wherein said control unit, following the command of the actuator to move the stop in the release position, is configured for commanding the auxiliary actuators to move the plurality of arms from the extended position to the retracted position or from the retracted position to the extended position.

In one aspect according to any one of the preceding aspects, the lift comprises a command unit manually actuatable by a user and connected to the control unit, said command unit being configured for generating an enabling signal for the movement of the platform, wherein the control unit, during the blocking of the platform in the lowered position, is configured for:

- receiving the signal for enabling the command unit,
- following the reception of the enabling signal, commanding the movement system for moving the platform.

One aspect concerns a lifting plant comprising:

- a pit in the ground and defining a compartment, said compartment being delimited by a bottom and by a predetermined number of lateral walls emerging from the bottom, wherein said predetermined number of lateral walls delimit, on the side opposite the bottom, a top opening placed at the level of the ground,
- a lift at least partly housed in the compartment of the pit.

In one aspect according to the preceding aspect, the lift is in accordance with any one of the preceding aspects. In one aspect according to any one of the two preceding aspects, the lift is fixed to the bottom of the pit. In one aspect according to any one of the three preceding aspects, the base of the movement system is fixed to the bottom of the pit.

In one aspect according to any one of preceding aspects directed to the lifting plant, the platform is movable entering to and exiting from the compartment of the pit. In one aspect according to any one of preceding aspects directed to the lifting plant, the platform, in the lifted position, is placed completely outside the compartment of the pit. In one aspect according to any one of preceding aspects directed to the lifting plant, the platform, in the lowered position, is placed completely outside the compartment of the pit. In one aspect according to any one of preceding aspects directed to the lifting plant, the platform, in the lowered position, is placed at a minimum distance from the top opening of the pit shorter than a minimum distance between said top opening and the platform when said platform is placed in the lifted position.

In one aspect according to any one of preceding aspects directed to the lifting plant, the platform, in the recessed position, is placed at least partly in the compartment of the pit. In one aspect according to any one of preceding aspects directed to the lifting plant, the upper plate of the platform, in the recessed position, is arranged at the top opening. In one aspect according to any one of preceding aspects directed to the lifting plant, the sensor is completely arranged in the compartment of the pit.

One aspect concerns a process of lifting vehicles using a lift according to any one of the preceding aspects. In one aspect according to the preceding aspect, the process has the steps of:

arranging the vehicle above the platform, arranging the platform in the lowered position of the platform, in the lowered position of the platform, moving the stop by the actuator in the release position to allow the relative movement of the arm.

In one aspect according to the preceding aspect, the process also comprises the steps of:

in the release position of the stop, moving each arm from the retracted position to the extended position, subsequently, moving the stop in the grip position by the actuator to block the relative movement of the arm with respect to the platform, following the blocking of the arm, moving the platform from the lowered position towards the lifted position to allow the lifting of the vehicle with respect to the ground.

In one aspect according to any one of the two preceding aspects, before the positioning of the vehicle above the platform, said platform is placed in the recessed position. In one aspect according to any one of the three preceding aspects, following the arrangement of the vehicle above the platform, said platform is moved from the recessed position to the lowered position. In one aspect according to the preceding aspect, during the movement of the platform away from the recessed position, the sensor is activated by the actuation body, following the activation, the sensor sends a signal to the control unit representative of reaching the lowered position by the platform, wherein the control unit, following the reception of the signal by the sensor, commands stopping of the movement system to block the platform in the lowered position.

In one aspect according to any one of the preceding aspects of the process, following reaching the lowered position, the movement of the arm from the retracted position to the extended position is executed:

manually by an assigned operator, or by the auxiliary actuator on command of the control unit.

In one aspect according to any one of the preceding aspects of the process, only following the blocking of the arms by means of the stop, the platform is moved by the movement system on command of the control unit.

An aspect concerns a process of lowering a vehicle using a lift in accordance with any one of the preceding aspects. In one aspect according to the preceding aspect, the process comprises the steps of:

moving the platform from the lifted position in the direction of the lowered position, blocking the platform in the lowered position, in the lowered position of the platform, moving the stop in the release position by the actuator to allow the relative movement of the arm, moving each arm from the extended position to the retracted position.

In one aspect according to either of the two preceding aspects of the lowering process, following the movement of each arm in the retracted position, the process also comprises a step of moving the stop in the grip position to block the relative movement of the arm with respect to the platform.

In one aspect according to any one of the preceding aspects of the lowering process, after the movement of the arm in the retracted position, and optionally after the blocking of said arm, the process comprises a movement of the platform from the lowered position to the recessed position.

In one aspect according to any one of the preceding aspects of the process, during the movement of the platform from the lifted position in the direction of the lowered position, the sensor is activated by the actuation body; following the activation, the sensor sends a signal to the control unit, representative of reaching the lowered position by the platform, wherein the control unit, following the reception of the signal by the sensor, controls the stop of the movement system to block the platform in the lowered position.

In one aspect according to any one of the preceding aspects of the process, following reaching the lowered position, the movement of the arm from the extended position to the retracted position, is executed:

manually by an assigned operator, or by the auxiliary actuator on command of the control unit.

In one aspect according to any one of the preceding aspects of the process, only following the blocking of the arms by the stop, the platform is moved by the movement system on command of the control unit such that the platform may reach the recessed position.

BRIEF DESCRIPTION OF THE DRAWINGS

Some embodiments and some aspects of the invention will be described hereinafter with reference to the attached exemplifying and therefore not-limiting drawings, wherein:

FIG. 1 is a perspective view of a lift according to aspects of the present invention installed in a pit;

FIGS. 2 and 3 are detailed perspective views of a lift according to aspects of the present invention;

FIGS. 4 and 5 are detailed perspective views of a stop in a release position, according to aspects of the present invention;

FIG. 6 is a detailed perspective view of a stop in a grip position, according to aspects of the present invention;

FIG. 7 is a section view of a stop of a lift according to aspects of the present invention;

FIG. 8 is a side view of a lift according to aspects of the present invention;

FIGS. 9 and 10 are perspective views of a platform of a lift according to aspects of the present invention in a lowered position;

FIG. 11 is a detailed view of the lift of FIGS. 9 and 10;

FIG. 12 is a side view of a platform of a lift according to aspects of the present invention, placed in a recessed position.

DEFINITIONS AND CONVENTIONS

In the present detailed description, corresponding parts illustrated in the accompanying figures are indicated using the same reference numbers. The figures could illustrate aspects of the invention using non-full-scale representations; thus, parts and components illustrated in the figures could exclusively regard schematic representations.

The terms "horizontal" or "vertical" used in relation to components of the lift, refer to a use condition during which the lift executes, or may be used for, lifting/lowering a vehicle with respect to the ground.

The lift described and claimed hereinbelow may comprise/use at least one control unit 50 designed to control operating conditions provided by the lift and/or the control of the method steps for lifting a vehicle. The control unit 50 may be a single unit or it may consist of a plurality of distinct control units depending on the design choices and operative needs.

The expression "control unit" is used to indicate an electronic component which may comprise at least one of: a digital processor (CPU), an analogue circuit, or a combination of one or more digital processors with one or more analogue circuits. The control unit may be "configured" or "programmed" to perform some steps: this may basically be obtained using any means which allows to configure or program the control unit. For example, should the control unit comprising one or more CPUs and one or more memories, one or more programs may be stored in appropriate memory banks connected to the CPU or to the CPUs; the program or programs contain instructions which, when run by the CPU or by the CPUs, program or configure the control unit to perform the operations described relating to the control unit. Alternatively, if the control unit is or comprises an analogue circuit, then the circuit of the control unit may be designed to include a circuit configured, in use, to process electrical signals so as to perform the steps relative to the control unit.

Parts of the process described herein may be obtained by a data processing unit, or control unit, which may be technically replaced with one or more computers designed to run a portion of a software or firmware program loaded on a storage medium. Such software program may be written in any programming language of the known type. If two or more, the computers may be connected to each other through a data connection such that the computing capacity thereof is shared in any manner; therefore, the computers may even be installed in geographically different positions, creating a distributed computing environment through the aforementioned data connection.

The data processing unit, or control unit, may be a general-purpose processor configured to run one or more parts of the process identified in the present disclosure through the software or firmware program, or it may be an ASIC or dedicated process or an FPGA, specifically programmed to at least partly carry out operations of the process described herein.

The storage medium may be non-transitory, and it may be inside or outside the processor, or control unit, or data processing unit, and it may—specifically—be a memory geographically arranged remotely with respect to the computer. Furthermore, the storage medium may be physically split into several portions, or in the form of a cloud-based resource, and the software or firmware program may physically provide for portions stored on storage portions geographically split from each other.

The expression "actuator" is used to indicate any one device suitable for generating a movement on a body, for example following a command of the control unit. The actuator may be of electric type (e.g., an electric motor), pneumatic type, mechanical type (e.g., with spring), hydraulic type (e.g., a hydraulic cylinder) or yet another type.

DETAILED DESCRIPTION

Lift

Reference number 1 indicates an in-ground vehicle lift employable in the automotive field for servicing vehicles, e.g., cars, trucks, farm vehicles. The lift 1 may be installed in a pit 101 in the ground S (FIG. 1) which may include a bottom 101*a* from which at least one lateral wall 101*b* emerges: the bottom 101*a* together with the lateral wall 101*b* delimit a compartment V suitable for housing the lift 1. The lateral wall 101*b* defines, opposite the bottom, a top opening 101*c* through which the lift may pass and be received in the compartment V, or through which the lift may exit for lifting vehicles.

The lift 1 comprises a movement system 2 which may be installed in the pit 101. In detail, the movement system comprises a base 29 fixable to the bottom 101*a* of the pit, and a frame 30 engaged with the base 29; during an operating condition of the lift 1, the frame 30 is movable relative to said base to lift vehicles. Indeed, the frame 30 represents the thrust component of the lift which allows, in use, lifting and lowering the vehicle with respect to the ground S. The frame 30 may comprise an articulated parallelogram or a scissors system moved by a cylinder 32 (FIG. 11), optionally hydraulic; in the accompanying figures, a frame 30 comprising a scissors system is illustrated in a non-limiting manner. It is understood that different movement systems 2 (e.g., a movement system comprising a plurality of hydraulic cylinders or an electric motor active on a mechanical transmission) may also be used.

The lift 1 comprises a platform 3 engaged with the movement system 2. In detail, the platform 3 is directly engaged to the frame 30, opposite the base 29. The platform 3 may have a rectangular parallelepiped shape and may extend substantially along an ideal plane. The platform 3 has an overall size, define along the ideal plane, smaller than the passage section of the top opening 101*c* of the pit 101; this allows the platform 3 to pass through the top opening and to be arranged at least partly in the compartment V (FIG. 12).

In more detail, the platform 3 comprises an upper plate 3*a* defining a (top) abutment plane of the platform 3 which, in use, is configured for directly facing the vehicle to be lifted. The platform 3 also comprises at least one lower plate 3*b* opposite the upper plate 3*a* and facing, in use, the bottom 101*a* of the pit 101. The lower plate 3*b* faces and is spaced from the upper plate 3*a* and defines, in cooperation with said upper plate, at least one lateral pocket 23.

In detail, the platform 3 has two lower plates 3*b* arranged at opposite sides of the platform 3, in particular at the long sides of the rectangular parallelepiped of the platform; each of said lower plates defines, in cooperation with the (single) upper plate 3*a*, a respective lateral pocket 23. Each lower plate 3*b* extends for the entire length of the upper plate 3*a* to define a lateral pocket 23 extending along the entire longitudinal extension of the platform 3.

The platform 3 comprises an engagement portion suitable for constraining an arm 4 which, as will be further described hereinbelow, is suitable for lifting a vehicle placed above the platform. The engagement portion is defined, in a non-limiting manner, at a corner portion of the platform 3 and may comprise a pin 19 engaged with the upper plate and with the lower plate 3*b*. In particular, the platform 3 may comprise four separate engagement portions defined at each corner portion of the platform; thus, four pins 19 are present, each of which is configured for engaging a respective arm 4.

As shown in FIG. 7, the platform 3 comprises, at each engagement portion, a through opening 5*a* defined on the lower plate 3*b* and an opposite blind sleeve 5*b* carried by the upper plate 3*a*. In particular, the platform 3 comprises a through opening 5*a* and a sleeve at each corner portion.

As mentioned above, the platform 3 engages the frame 30; in detail, the frame 30 is directly engaged below the upper plate 3*a* and it is at least partly interposed between the two opposite lower plates 3*b*. The frame 30 is configured for moving the platform 3 relative to the base 29 between a plurality of operating positions, entering to and exiting from the pit 101.

The movement system 2 is configured to move the platform 3 along a lifting direction X, which in use is vertical: the lifting direction X is substantially orthogonal to the ideal lying plane of the platform 3. In detail, the platform 3 is movable along the lifting direction X, close to and away from the base 29 at least between:

a lifted position where the platform 3 is configured for being placed completely outside the pit 101 (FIG. 1), a lowered position (FIG. 9) where the platform 3 is configured for being placed completely outside the pit 101, at a distance D2 from the ground S shorter than a distance D1 between the ground S and the platform 3 when said platform 3 is in the lifted position, a recessed position (FIG. 12) where the platform 3 is placed at least partly in the pit 101 substantially aligned with the ground S.

In the lifted position, the platform 3 is configured for lifting a vehicle with respect to the ground S. In the lowered position, the platform 3 is in proximity of the base 29, but still completely outside the pit 101 and spaced from the bottom 101; in the lowered position, the platform 3 is configured for being arranged in proximity to the vehicle, still remaining at a distance from the bottom 101. In the recessed position, however, the platform 3 is placed at least partly in the compartment V such that the upper plate 3*a* is aligned with the ground S; in such position, the platform 3 allows the vehicle to be moved above the lift 1 which is placed in part in the compartment V: in this manner, the vehicle may be correctly positioned above the lift 1 for the execution of the lifting procedure.

Indeed, during a procedure for lifting the vehicle, the platform 3 is initially placed by the movement system 2 in the recessed position such that the lift may receive the vehicle on the lift upper part. Then, the movement system 2 is actuated for arranging the platform 3 in the lowered position; in such position the lift 1 is prepared for initiating the lifting of the vehicle. Only afterwards, the platform 3 is moved from the lowered position towards the lifted position away from the base 29 such that the vehicle may be lifted with respect to the ground S.

As mentioned above, the lift 1 comprises at least one arm 4 carried by the platform 3 and configured for lifting a vehicle. The arm 4 represents the component of the lift 1 suitable for directly contacting the vehicle (e.g., the vehicle body): the platform 3 directly supports the arm 4 which is then movable together with said platform 3 between the operating positions of the platform 3 (i.e., the recessed position, the lowered position and the lifting position). The arm 4 is thus configured for lifting the vehicle while the platform exits from the pit 101 and moves from the lowered position to the lifted position.

The arm 4 extends from an attachment portion 4*a*, at which the arm is constrained to the platform 3, to an end portion 4*b* at which the arm 4 comprises a support 18 configured for directly contacting the vehicle; for example, the support may comprise at least one of: an abutment foot, an abutment disc, an abutment pin. The support 18 may be made at least partly of plastic material (e.g., rubber) to allow a correct abutment of the vehicle on the lift.

With regard to size, the arm 4 extends from the attachment portion 4*a* to the end portion 4*b* along an extension direction: the arm 4 has a length, measured along said extension direction, greater than 200 mm, and optionally comprised between 300 mm and 700 mm.

At the attachment portion 4*a*, the arm 4 comprises an engagement portion constrained to the engagement portion of the platform 3. In detail, the engagement portion of the arm 4 may comprise one or more plates provided with a through hole suitable for receiving the pin 19 of the platform (FIG. 3); as shown in FIG. 3, the pin 19 passes through the mentioned hole.

As shown in FIG. 1, the lift 1 may comprise a plurality of arms 4, e.g., four arms. Each one of the arms may be engaged at a respective corner portion of the platform 3. FIG. 1 shows, in a non-limiting way, a lift 1 with one arm 4 for each corner portion of the platform 3. In detail, the lift 1 may comprise:

a first pair of arms engaged at a first flank of the platform 3, a second pair of arms engaged at a second flank of the platform 3, opposite said first flank.

The arms 4 are engaged in interposition with the upper plate 3*a* and with the lower plate 3*b* lying on a single ideal plane parallel to the ideal lying plane of the platform 3.

Each arm 4 (optionally each arm 4) is movable relative to the platform 3 at least between an extended position and a retracted position. In the extended position, each arm 4 laterally emerges from the platform 3 (FIG. 1) while, in the extended position (FIG. 6), each arm 4 is side-by-side with the platform 3, for example placed at least partly within the respective lateral pocket 23.

In more detail, each arm 4 may be hinged to the platform 3 at a respective corner portion and rotatably movable around an axis Z that is substantially orthogonal to the ideal lying plane of the platform 3; the pin 19 and the hole on the arm define a hinge coupling allowing rotation of the arm between the extended position and the retracted position.

In the extended position, the arm 4 has the end portion 4*b* (optionally the support 18) spaced from the platform 3; for example, in the extended position, the support 18 is placed at a minimum distance from the platform 3 greater than 300 mm, optionally comprised between 350 mm and 750 mm. However, in the retracted position, the end portion 4*b* of the arm 4 (optionally the support 18) is alongside to a flank of the platform 3. Indeed, in the retracted position, the entire arm 4 is alongside a flank of the platform 3, at least partly placed in the respective pocket 23 such that said arm 4 is placed substantially within a lateral size of the platform 3.

In detail, each arm 4 is rotatable movable with respect to the platform 3 such that each arm may be arranged in the extended position in the lifting position; on the other hand, each arm may be arranged in the retracted position during movement of the platform entering the pit (i.e., at least during movement of the platform 3 from the lowered position to the recessed position). Indeed, each arm 4 is movable (e.g., rotatably movable) from the retracted position to the extended position (and vice versa) only when the platform is in the lowered position where, as specified above, the lift 1 is placed outside the pit 101.

In detail, during the lifting procedure the arms 4 are initially in the retracted position with the platform placed in the recessed position. Then, the movement system 2 lifts the platform 3 in the lowered position; in the lowered position, the movement of the platform 3 is stopped and the arms 4 can rotate from the retracted position to the extended position such that said arms may contact and lift a vehicle. Then, the platform 3 is moved from the lowered position towards the lifted position to lift a vehicle. During vehicle lowering procedure, the platform 3 is instead moved from the lifted position and then stopped in the lowered position; in the lowered position each arm 4 rotates in the retracted position such that the platform 3 may (once again) move in the recessed position (inside the compartment V) without the arms 4 interfering with the ground S.

The described movement of the arms is permitted because the lift 1 in the extended position of the arms 4 has a size greater than the passage section delimited by the top opening 101*c* of the pit; on the other hand, when the arms 4 are placed in the retracted position, the lift 1 has an overall horizontal size smaller than the passage section of the top opening 101*c* of the pit 101 such that said platform 1 may be moved, without interference with the ground S, in the compartment V of the pit 101.

As specified above, the lift 1 may comprise a first and a second pair of arms. The arms of each pair, during their movement between the retracted position and the extended position, space the respective end portions 4*b* from each other and with respect to the flank of the platform 3: the arms of each pair, in the retracted position, have the respective end portions 4*b* close to the platform and facing each other.

The movement (optionally the rotation) of the arm 4 between the extended position and the retracted position, and vice versa, may be manually executed by an operator or it may be executed by an auxiliary actuator 24 (FIG. 3).

The auxiliary actuator 24 may be engaged, on one side, to the platform 3 and, on an opposite side, to the arm 4. In detail, the auxiliary actuator 24 may be hinged to the platform 3 and, on the other side, it may be slidingly engaged with a guide 3*c* of the platform 3: for example, the guide 3*c* may be defined by a through groove defined on the lower plate 3*b* suitable for slidingly engaging a pin carried by the auxiliary actuator 24. The pin carried by the auxiliary actuator may, in turn, be hinged to a lever 34 (FIG. 2) which, on the opposite side, is hinged at the attachment portion 4*a* of the arm (or hinged to an intermediate portion of the arm, interposed between the attachment portion 4*a* and the end portion 4*b*).

Each arm 4 may nevertheless be blocked with respect to the platform 3 both in the retracted position and in the extended position such that said arm 4 is fixed with respect to the platform 3. For example, the arm may be blocked in the extended position during the movement of the platform 3 from the lowered position to the lifted position, and vice versa, such that the arm may safely support the vehicle during lifting/lowering steps. Each arm 4 may be further blocked in the retracted position, for example during the movement of the platform 3 between the lowered position and the recessed position to prevent the arms from being undesirably extended and thus interfere with the ground.

Indeed, the movement release of the arm 4 is only executed in the lowered position of the platform 3 to ensure that said arm:

- may be arranged in the extended position for lifting the vehicle, or
- may be arranged in the retracted position to allow the movement of the platform 3 into the compartment V of the pit 101.

The arm 4 may comprise a blocking body 20 defined at the attachment portion 4*a*, optionally interposed between the upper plate 3*a* and the lower plate 3*b*; the blocking body 20 is configured for engaging a stop 6 of the lift for blocking the arm relative to the platform 3. In detail, the blocking body 20 comprises a toothed profile 21: for example, the toothed profile may comprise a plurality of teeth aligned along a curvilinear, optionally a circular, trajectory. For example, the blocking body 20 may comprise a toothed wheel or a toothed half-wheel fixed to the engagement portion of the respective arm 4; the blocking body 20 may be fixed to a lower plate of the engagement portion of the arm, as shown in FIG. 4.

As mentioned above, the lift 1 comprises at least one stop 6 (optionally a stop 6 for each arm 4) carried by the platform 3 and movable relative to said platform at least between:

- a grip position where the stop 6 engages the arm 4 to block the relative movement (optionally the rotation) between said arm 4 and the platform 3, and
- a release position where the stop 6 disengages the arm 4 to allow the movement of said arm (optionally the rotation) between the extended position and the retracted position.

In detail, the stop 6 is interposed between the upper plate 3*a* and the lower plate 3*b*. At least part of the stop 6 is slidingly movable through the through opening 5*a* of the lower plate 3*b*, along a direction L (FIG. 7) substantially parallel to the lifting direction X of the platform 3 (direction L is, in use, vertical). In detail, the stop 6 comprises a rod 6*a*, e.g., a cylindrical rod, on which a blocking head 6*b* is fixed. In more detail, the rod 6 comprises:

- a first section 6*a*' slidingly engaged in the through opening 5*a* defined on the lower plate 3*b*,
- a second section 6*a*" or a part of the second section 6*a*" slidingly engaged in the blind sleeve 5*b*, carried by the upper plate 3*a*.

The blocking head 6*b* is fixed to the rod 6*a* at an intermediate portion, optionally interposed between the first and the second section 6*a*', 6*a*" of the rod 6: the blocking head 6*b* is thus spaced from the through opening 5*a* and interposed between the upper plate 3*a* and the lower plate 3*b*. The blocking head 6*b* comprises at least one of the following: a toothed profile, a toothed wheel, a pad sliding block. The blocking head 6*b*, in the grip position of the stop, engages the blocking body 20 of the respective arm to block the relative movement between said arm 4 and the platform 3.

As described above, the arm 4 is blocked to the platform 3 during the steps of movement of the platform 3 or in the lifted and recessed positions; the arm 4 is substantially released from the platform 3, and hence movable between the extended position and the retracted position, only in the lowered position of the platform. Therefore, during movement of the platform 3 or in the lifted and recessed positions, the stop 6 is maintained in the grip position 6 to lock the respective arm 4 with respect to the platform 3.

The lift 1 may comprise an actuator 7, optionally carried by the platform 3, active on at least one stop 6. In detail, the lift 1 may comprise an actuator 7 for each stop 6; the actuator 7 is configured for moving the stop 6 between the grip position and the release position. Indeed, the actuator 7 is configured for moving the stop 6 to engage/disengage the blocking head 6*b* of the stop 6 and the blocking body 20 of the respective arm 4.

The actuator 7 may be engaged with the upper plate 3*a* or with the lower plate 3*b*. In the accompanying figures, an actuator 7 is shown in a non-limiting manner; such actuator 7, in use, is engaged below the lower plate 3*b*, opposite the upper plate 3*a* with respect to the stop 6.

In detail, the actuator 7 is configured to push on the stop 6, optionally directly pushing on the rod 6*a*, to move the stop 6 along the direction L (FIG. 7). In the grip position of the stop 6, the blocking head 6*b* is approached to the lower plate 3*b* and engages the blocking body 20; the stop 6, in the grip position, is then moved along the direction L by the actuator 7 which allows moving the blocking head 6*b* away from the lower plate 3*b* to disengage said blocking head 6*b* from the blocking body 20 (FIG. 7).

Indeed, the actuator 7 is configured for generating, at least in the lowered position of the platform 3, a thrust force acting on the stop 6 having direction exiting from the pit 101 (i.e., in use, an upward, vertical direction substantially parallel to the lifting direction X).

The actuator 7 may comprise a hydraulic cylinder or a pneumatic cylinder including: a jacket 12, and a stem 11 alternatively movable for entering into and exiting from the jacket 12 (FIG. 7). The jacket is fixed to the platform 3, optionally to the lower plate 3*b*, while the stem 11 is movable at least between:

an upper end stop position where a main part of the stem 11 exits from the jacket 12, and a lower end stop position where a main part of the stem 11 is placed inside the jacket 12.

The stem 11, in the upper end stop position, passes the through opening 5*a* on the lower plate of the platform 3 and pushes on the first section 6*a*' of the rod 6*a* to maintain the stop 6 in the release position; the stem 11, at least in the lowered position of the platform 3, is movable between the lower end stop position and the upper end stop position to move the stop 6 from the grip position to the release position.

The stem 11, in the lower end stop position, is placed outside the through opening 5*a* allowing the stop 6 to reach the grip position. During movement from the lower end stop position to the upper end stop position, the stem 11 passes through the through opening 5*a* such that said stem 11 may directly push on the first section 6*a*' of the rod 6*a* to allow the disengagement of the blocking head 6*b* of the blocking body 20 of the arm: during such movement, the second section 6*a*" of the rod 6*a* moves inside the sleeve 5*b* which guides such sliding movement along the direction L.

The stem 11 is movable between the lower end stop position and the upper end stop position, in the lowered position of the platform, when the arm 4 is in the retracted position or in the extended position; the stem 11, during the movement of the arm between the retracted position and the extended position is in the upper end stop position to maintain the stop 6 in the release position. In operation, the stem 11 is movable from the lower end stop position to the upper end stop position by introducing a work fluid (e.g., oil or air) in the jacket 12; for example, the stem 11 is movable from the lower end stop position to the upper end stop position when the pressure of the fluid present in the jacket 12 is equal to or greater than 1 bar, optionally between 1 bar and 10 bar.

The movement of the stop 6 from the release position to the grip position may also be executed by the actuator 7. Alternatively, such movement may be imparted, in a non-limiting manner, directly by a return element 9 pushing on the stop 6 to force said stop to maintain the grip position. The return element 9 may also be carried by the platform 3 and be arranged opposite the actuator 7 with respect to the stop 6. For example, the return element 9 may be interposed between the platform 3 and the stop 6; in detail, the return element 9 may be positioned between the upper plate 3*a* and the blocking head 6*b* of the stop 6. The return element 9 may push (e.g., in a direct manner) on the blocking head 6*b* of the stop 6 to force the grip position. The return element 9 may comprise a spring at least partly housed in the blind sleeve 5*b*: the stop 6 is interposed between the actuator 7 and the return element 9. The spring may house the rod 6*a* on the second section 6*a*". The return element may nevertheless comprise any component suitable for moving the stop element 6, e.g., the return element 9 may comprise at least one of: a compression spring, a torsion spring, a hydraulic actuator, a pneumatic actuator, an electric motor.

Indeed, the actuator 7 is configured for pushing on the rod (on the first section 6*a*' of the rod 6*a*) to move the stop 6 from the grip position to the release position; in order to do this, the actuator 7, when activated, generates a thrust force on the stop 6 (on the rod 6*a*) greater than a return force impartible by the return element 9. In this manner, the actuator 7 may overcome the force impartible by the return element 9 and release the movement of the arm 4. In order to bring back the stop 6 in the grip position, it is possible to deactivate the actuator 7 such that the return element 9 may push the stop 6, bringing the stem 11 of the actuator 7 back into the lower end stop position.

Alternatively, the movement of the stop 6 from the release position to the grip position may be caused by the weight of the same stop 6; in such configuration, the actuator 7 is configured for overcoming the weight of the stop 6 during the release position while, during passage from the release position to the grip position, the actuator 7 is configured for allowing the stop 6 to fall and engage with the blocking body 20.

As specified above, the release of the arms 4 is executed only in the lowered position of the platform 3, since during movement of the platform 3 into the lifted and recessed positions, it is appropriate that said arms be blocked in position (extended or retracted). Therefore, the actuator 7 is only activated in the lowered position of the platform 3 such that the arms 4 may be moved (optionally rotated) with respect to the platform 3 between the extended position and the retracted position. Once the desired position of the arms 4 is reached and before the movement of the platform, the actuator 7 allows the movement of the stop 6 from the release position to the grip position such that the position of the arms 4 with respect to the platform is blocked.

In order to be able to identify the lowered position of the platform 3, the lift 1 may have at least one sensor 26 configured for generating a signal representative of at least one of: a position of the platform 3, a minimum distance between the platform 3 and the ground S. The sensor 26 may comprise at least one switch 26*a* carried by the movement system 2, optionally fixed to the base 29 and placed in the compartment V of the pit 101; the switch may be activated by an actuation body 25 carried by the platform 3; the actuation body 25 is configured for contacting the switch 26*a* at least in the lowered position of the platform 3: the signal generated by the sensor 26, optionally by the switch 26*a*, is thus representative of the platform 3 being in the lowered position. As shown in FIG. 6, the platform 3 may comprise an adjuster 27 configured for moving the actuation body 25 relative to the platform 3, optionally along a direction parallel to the lifting direction X.

Alternatively, the sensor 26 may be associated directly with at least one arm 4 and configured for detecting a distance between the arm (indirectly of the platform 3) and the base 29, which may give an indication of the position reached by the platform 3. The lift 1 may comprise a control unit 50 connected to the movement system 2 and to the sensor 26; the control unit 50 may be configured to:

command the movement system 2 to move the platform 3 relative to the base 29 (close to and away from the ground S), receive the signal from the sensor 26 to determine that the platform is or has reached the lowered position, following determination of the platform in the lowered position, command blocking of the movement system 2 to stop the platform 3 in said lowered position.

The control unit 50, following blocking the platform 3 in the lowered position, is configured for commanding the actuator 7 to move the stop 6 in the release position such that the arm 4 is movable, optionally rotatably movable, relative to the platform 3. At this point, the arm 4 may be manually moved by a user or it may be moved by the auxiliary actuator 24; in the event that the auxiliary actuator 24 is present, the control unit 50 is configured for commanding the activation of the actuator 7 to move the stop 6 in the release position and only subsequently commanding the activation of the auxiliary actuator 24 to move the arm 4 relative to the platform 3.

The control unit 50, following the command of the actuator 7 to move the stop 6 in the release position, is configured for:

commanding the actuator 7 to move the stop 6 in the grip position to block once again the arm 4 with respect to the platform 3, after blocking the arm 4 with respect to the platform 3, enabling the movement of the platform 3 by commanding (activation) of the movement system 2.

The lift 1 may further comprise a command unit 51 (FIG. 9) manually actuatable by a user and connected to the control unit 50; the command unit 51 is configured for generating an enabling signal for the movement of the platform 3. In particular, the control unit 50, during the blocking of the platform 3 in the lowered position, is configured to:

receive the enabling signal from the command unit 51, following the reception of the enabling signal, command the movement system 2 to move the platform 3.

Indeed, the command unit 51 defines a manual command of release of the movement system 2 to thus allow movement of the platform 3 from the lowered position to the recessed position or to the lifted position.

Lifting Plant

Lifting plant 100 comprises a pit in which a lift 1 is housed according to the attached claims and/or according to the description reported above.

In detail, the base 29 of the movement system 2 is entirely housed in the pit 101 and fixed, e.g., by screws, to the bottom 101*a*. The frame 30 of the movement system 2 is engaged with the base 29 and movable relative to said base allowing the platform 3 to enter in and exiting from the compartment V of the pit 101.

The platform 3, in the lifted position, is placed completely outside the compartment V of the pit 101 and is spaced from the top opening 101*c*; the platform 3, in the lowered position, is placed completely outside the compartment V of the pit 101: the platform 3, in the lowered position is placed at a minimum distance from the top opening 101*c* of the pit 101 smaller than a minimum distance between said top opening 101*c* of the pit 101 and the platform 3 when said platform is placed in the lifted position. The platform 3, in the recessed position, is instead placed at least partly in the compartment V of the pit 101; for example, in the recessed position, the upper plate 3*a* of the platform 3 extends in correspondence of the top opening 101*c*.

Process of Lifting Vehicles

A process of lifting vehicles using a lift 1 according to the attached claims and/or according to the description reported above is also described.

The lifting process comprises a step of arranging the platform 3 in the recessed position; in such position the upper plate 3*a* is placed at the top opening 101*c* of the pit such that a vehicle may transit above the lift. In the recessed position, each actuator 7 is configured for commanding the grip position of each stop 6 such that the arms 4 are blocked with respect to the platform 3 in the retracted position. In detail, the control unit 50 is configured for commanding a deactivation of the actuator 7 such that the return element 9 may press the rod 6*a* to move the blocking head 6*b* in engagement with the blocking body 20 of the respective arm 4.

Then, the process comprises a step of arranging a vehicle above the lift 1. Subsequently, the platform 3 is moved from the recessed position towards the lowered position: during such movement each actuator 7 is deactivated such that each stop 6 is arranged in the grip position. Upon reaching the lowered position, the platform 3 is stopped by blocking of the movement system 2. Such step may be executed by the control unit 50 commanding said movement system 2. The lowered position may be determined by the control unit 50 as a function of the signal emitted by the sensor 26.

Following the blocking of the platform 3, each arm 4 is released and becomes movable relative to the platform 3. In detail, the actuator 7, upon command of the control unit 50, is activated such that the same may move the stop 6 from the grip position to the release position: in the release position, the stop 6 disengages the respective arm 4 to allow the movement (optionally the rotation) of said arm from the retracted position to the extended position. The movement of each arm 4 may be executed manually or by the auxiliary actuator 24 under control of the control unit 50.

Once the arms 4 are in the extended position, each actuator 7 is moved by the upper end stop position to the lower end stop position to once again allow the stop 6 to position in the grip position for blocking of the respective arm 4. Such step may be performed by the control unit 50, which may control deactivation of the actuator 7 such that the return element may once again move the stop 6 from the release position to the grip position.

Following blocking of the arms 4, the platform 3 may move from the lowered position towards the lifted position to allow lifting of the vehicle with respect to the ground S. During movement of the platform, the actuator 7 is configured for allowing the stop 6 to reach the grip position to maintain the arms 4 fixed to the platform 3 and prevent undesired movements of the vehicle being lifted.

Process of Lowering Vehicles

A process of lowering vehicles using a lift 1 according to the attached claims and/or according to the description reported above is also disclosed.

The lowering process starts with the platform 3 in the lifted position; in such position, the upper plate 3*a* is spaced from the top opening 101*c* of the pit and the vehicle lifted with respect to the ground S. In the lifted position, each actuator 7 is placed in the lower end stop position for the stops 6 to maintain the grip position such that the arms 4 are blocked with respect to the platform 3 in the extended position. Such condition may be controlled by the control unit 50 configured for commanding a deactivation of the actuators 7 such that the return elements 9 may press on the respective rod 6*a* to block head 6*b* of the stops in engagement with the blocking body 20 of the respective arms 4.

Then, the platform 3 is moved from the lifted position towards the lowered position: during such movement each actuator 7 is deactivated such that each stop 6 is arranged in the grip position. Upon reaching the lowered position the platform 3 is stopped by blocking the movement system 2. Such step may be executed by the control unit 50 commanding said movement system 2. The lowered position may be determined by the control unit 50 as a function of the signal emitted by the sensor 26. Following blocking of the platform 3, each arm 4 is released and made movable relative to the platform 3. In detail, each actuator 7, upon command of the control unit 50, is activated such that the same may move the stop 6 from the grip position to the release position: in the release position the stop disengages the arm 4 to allow movement (optionally rotation) of each arm from the extended position to the retracted position. The movement of each arm 4 may be executed manually or by the auxiliary actuator 24 controlled by control unit 50.

Once the arms 4 are in the retracted position, each actuator 7 is moved by the upper end stop position to the lower end stop position to once again allow the stops 6 to be placed in the grip position for blocking the arms 4. Such step may be performed by the control unit 50 which controls deactivation of the actuator 7 such that the return element 9 may once again move the stop 6 from the release position to the grip position.

Following blocking of the arm 4 (optionally of each arm), the platform 3 may be moved from the lowered position toward the recessed position to allow the platform 3 to at least partly enter into the compartment V of the pit 101 to then allow movement of the vehicle away from the lift. Indeed, the arrangement of the arms 4 in the retracted position allows the platform 3 to enter into the pit without the arms interfering with the ground S.

The invention claimed is:

1. A vehicle lift comprising:

a movement system configured to be installed in a pit in the ground, a platform engaged with the movement system and movable entering to and exiting from the pit, an arm carried by the platform and configured for lifting a vehicle, said arm being movable with respect to the platform at least between an extended position and a retracted position, a stop carried by the platform, said stop being movable relative to the platform at least between:

a grip position where the stop engages the arm to block relative movement of said arm with respect to the platform, a release position where the stop disengages the arm to allow said arm to move between the extended position and the retracted position, at least one actuator carried by the platform, said actuator being configured for moving the stop between the grip position and the release position, wherein the actuator comprises a hydraulic cylinder or a pneumatic cylinder comprising:

a jacket, a stem entering and exiting movable with respect to the jacket, said stem being in contact with the rod of the stop, wherein said stem is movable at least between:

an upper end stop position where a main part of the stem exits from the jacket, a lower end stop position where a main part of the stem is placed inside the jacket, wherein the stem, in the lowered position of the platform, is movable between the upper end stop position and the lower end stop position to move the stop from the grip position to the release position.

2. The lift according to claim 1, wherein the platform is movable at least between:

a lifted position where the platform is configured for being placed completely outside the pit, a lowered position where the platform is configured for being placed completely outside the pit, at a distance from the ground shorter than a distance between the ground and the platform when said platform is placed in the lifted position, wherein the arm, in the lowered position of the platform, is movable between the retracted position and the extended position.

3. The lift according to claim 2, wherein the arm is movable with respect to the platform only when the platform is in the lowered position, said arm being movable by said actuator.

4. The lift according to claim 2, wherein the actuator, in the lowered position of the platform, is configured for pushing on the stop to move said stop from the grip position to the release position.

5. The lift according to claim 1, wherein the stop comprises:

a rod engaged with the platform, a blocking head fixed on the rod, wherein the blocking head, in the grip position of the stop, engages the arm to prevent relative movement of said arm with respect to the platform.

6. The lift according to claim 1, wherein the platform comprises an upper plate and a lower plate opposite to the upper plate, wherein the stop is interposed between said upper plate and said lower plate.

7. The lift according to claim 6, wherein the stop comprises:

a rod engaged with the platform, a blocking head fixed on the rod, wherein the blocking head, in the grip position of the stop, engages the arm to prevent relative movement of said arm with respect to the platform; and wherein the platform comprises:

a through opening defined on the lower plate, said through opening receiving at least part of the rod of the stop and at least one portion of the actuator, a blind sleeve carried by the upper plate which guides a sliding movement of the rod of the stop;

further wherein the blocking head is interposed between said upper plate and said lower plate of the platform.

8. The lift according to claim 1, wherein the arm is rotatably movable with respect to the platform between the extended position and the retracted position, wherein the arm, in the extended position, laterally emerges from the platform, wherein the arm, in the retracted position, is side-by-side with the platform, wherein the arm extends from an attachment portion hinged to the platform to an opposite end portion, and wherein the end portion of the arm is configured for supporting a vehicle.

9. The lift according to claim 8, wherein the lift comprises:

a first pair of arms engaged to a first flank of the platform, a second pair of arms engaged to a second flank of the platform, opposite said first flank, wherein the arms of each pair, during movement between the retracted position and the extended position, space the respective end portions from each other and with respect to the flank of the platform, wherein the arms of each pair, in the retracted position, have the respective end portions close to the platform and facing each other.

10. The lift according to claim 1, wherein the arm has a blocking body, and wherein the stop, in the grip position, directly engages the blocking body of the arm to block the relative movement of said arm with respect to the platform.

11. The lift according to claim 10, wherein the blocking body operates at the attachment portion of the arm and is interposed between the upper plate and the lower plate of the platform, wherein a blocking head of the stop is configured for directly engaging the blocking body.

12. The lift according to claim 1 comprising a control unit configured for commanding the actuator in the lowered position of the platform to move the stop between the grip position and the release position.

13. The lift according to claim 12 comprising at least one sensor configured for generating a signal representative of at least one of:

a position of the platform, a minimum distance between the platform and the ground, wherein the control unit is connected to the movement system and to the sensor, wherein the control unit is configured to:

command the movement system to move the platform relative to the ground, receive the position signal from the sensor to determine when the platform is in the lowered position, following determination that the platform is in the lowered position, command blocking of the movement system to stop the platform in said lowered position, following the blocking of the platform in the lowered position, command the actuator to move the stop in the release position so that the arm is free to move relative to the platform.

14. The lift according to claim 13, wherein the control unit, following command of the actuator to move the stop into the release position, is configured for:

commanding the actuator to move the stop in the grip position so that the arm is fixed with respect to the platform, subsequently, newly commanding activation of the movement system to move the platform from the lowered position to the lifted position.

15. The lift according to claim 12, wherein the control unit is configured for commanding the actuator to move the stop in the release position only in the lowered position of the platform.

16. A vehicle lift comprising:

a movement system configured to be installed in a pit in the ground, a platform engaged with the movement system and movable entering to and exiting from the pit, an arm carried by the platform and configured for lifting a vehicle, said arm being movable with respect to the platform at least between an extended position and a retracted position, a stop movable between:

a grip position where the stop blocks relative movement of said arm with respect to the platform, a release position where the stop allows said arm to move between the extended position and the retracted position, at least one actuator configured for moving the stop between the grip position and the release position, at least one sensor configured for generating a position signal representative of at least one of: a position of the platform, and a minimum distance between the platform and the ground, a control unit connected with the sensor and configured for commanding the actuator to move the stop between the grip position and the release position on the basis of the position signal generated by said sensor.

17. The lift according to claim 16, wherein the platform is movable at least between:

a lifted position where the platform is configured for being placed completely outside the pit, a lowered position where the platform is configured for being placed completely outside the pit, at a distance from the ground shorter than a distance between the ground and the platform when said platform is placed in the lifted position, wherein the control unit controls the movement system and is configured to:

command the movement system to move the platform relative to the ground, receive the position signal from the sensor to determine when the platform is in the lowered position, following the determination that the platform is in the lowered position, command blocking of the movement system to stop the platform in said lowered position, following the blocking of the platform in the lowered position, command the actuator to move the stop in the release position so that the arm is free to move relative to the platform.

18. The lift according to claim 17, wherein the control unit is configured for commanding the actuator to move the stop in the release position only in the lowered position of the platform.

19. The lift according to claim 16 comprising four arms hinged to the platform and rotatably movable with respect to the platform between the extended position and the retracted position, wherein each arm extends from an attachment portion hinged to the platform to an opposite end portion configured for directly contacting the vehicle, wherein each arm has a blocking body defined at the attachment portion configured for cooperating with a respective stop, wherein each stop is configured for directly engaging the respective blocking body to block the respective arm with respect to the platform.

20. A vehicle lift comprising:

a movement system configured to be installed in a pit in the ground, a platform engaged with the movement system and movable entering to and exiting from the pit, an arm carried by the platform and configured for lifting a vehicle, said arm being movable with respect to the platform at least between an extended position and a retracted position, a stop carried by the platform, said stop being movable relative to the platform at least between:

a grip position where the stop engages the arm to block relative movement of said arm with respect to the platform, a release position where the stop disengages the arm to allow said arm to move between the extended position and the retracted position, at least one actuator carried by the platform, said actuator being configured for moving the stop between the grip position and the release position, wherein the arm is rotatably movable with respect to the platform between the extended position and the retracted position, wherein the arm, in the extended position, laterally emerges from the platform, wherein the arm, in the retracted position, is side-by-side with the platform, wherein the arm extends from an attachment portion hinged to the platform to an opposite end portion, and wherein the end portion of the arm is configured for supporting a vehicle.

21. A vehicle lift comprising:

a movement system configured to be installed in a pit in the ground, a platform engaged with the movement system and movable entering to and exiting from the pit, an arm carried by the platform and configured for lifting a vehicle, said arm being movable with respect to the platform at least between an extended position and a retracted position, a stop carried by the platform, said stop being movable relative to the platform at least between:

a grip position where the stop engages the arm to block relative movement of said arm with respect to the platform, a release position where the stop disengages the arm to allow said arm to move between the extended position and the retracted position, at least one actuator carried by the platform, said actuator being configured for moving the stop between the grip position and the release position, a control unit configured for commanding the actuator in the lowered position of the platform to move the stop between the grip position and the release position, wherein the control unit is configured for commanding the actuator to move the stop in the release position only in the lowered position of the platform.

* * * * *